Patented Sept. 11, 1923.

1,467,665

UNITED STATES PATENT OFFICE.

NATHANIEL G. WARTH, OF GALLIPOLIS, OHIO.

PNEUMATIC TIRE.

Application filed February 21, 1920. Serial No. 360,293.

*To all whom it may concern:*

Be it known that I, NATHANIEL G. WARTH, a citizen of the United States, residing at Gallipolis, in the county of Gallia and State of Ohio, have invented a certain new and useful Improvement in Pneumatic Tires, of which the following is a specification.

This invention relates principally to pneumatic tires of flattened or oblate cross section and therefore adapted to present a broad tread to the ground as distinguished from the narrow or linear tread presented by tire whose cross section is substantially circular.

The object of the present invention is to provide an improved construction in which the oblate form with its broad tread is effectively maintained and the side of the tire protected. I accomplish this generally by securing permanently between a tread member and an inflatable casing an endless inexpansible band of peculiar form and of stiff material to normally hold the tube and tread in the desired positions and yet permit sufficient radial and lateral flexion for all practical purposes. Further I incorporate this endless inexpansible member in such a way that in the operation of the tire it exerts the minimum of destructive action upon the tube and tread. Other objects of the invention will appear from the following description.

In the accompanying drawing illustrating embodiments of the invention,

Figure 1:
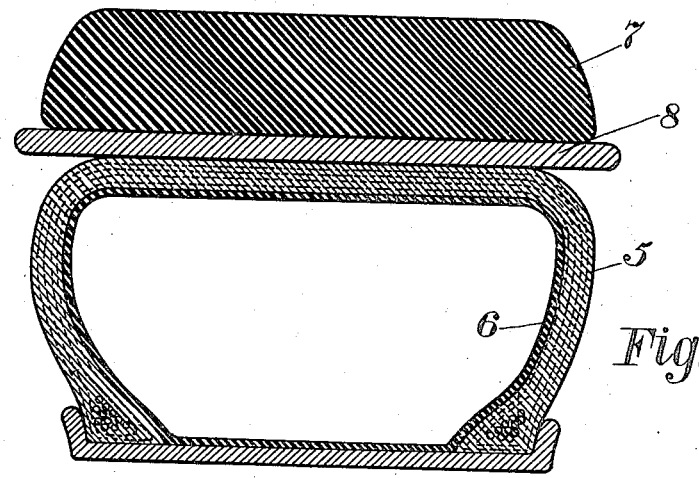
Figure 1 is a cross section of the tire and rim showing one form of the endless band.

Referring more particularly to Fig. 1 the character 5 designates the casing of usual materials of oblate form in cross section and 6 the inner inflating tube. The character 7 designates the tread portion which should be of solid rubber. Interposed between and adhesively secured to both the casing and the tread is an endless band 8 of stiff impenetrable material—preferably steel. The material employed for uniting the band with the casing and tread may be any suitable for effecting a firm connection between them. The band 8 in Fig. 1 is shown as being plain and straight in cross section and of a width to project somewhat beyond the edges of the tread and also beyond the plane of the sides of the casing. Said band 8 is made of sufficient thickness so as not in practice to be easily bent cross sectionally or indented. In the instance shown it is of greater width than the distance between the beads of the casing.

In practice the tire thus constructed yields to shock through a large arc rather than locally near the point where it strikes an obstruction. In other words there is little tendency to flexion opposite the point of contact because such flexion is resisted by the interposed band, the latter tending to yield as a whole or in a large arc carrying with it the parts with which it is incorporated. The band by reason of its width and lateral rigidity maintains the tread in flat broad form (as viewed in cross section). Because said band is located beyond the casing there is no tendency to work the destruction of that member. On the contrary the tendency is to prevent its rapid destruction and prolong its life. The laterally projecting edges of the band also serve as buffers to prevent injurious blows and wear as by contact with curbs on the sides of the casing and tread portions.

In both forms the tread portion is distinct from the inflatable portion and the tread portion can be renewed without disturbing the inflatable portion.

Figure 2:
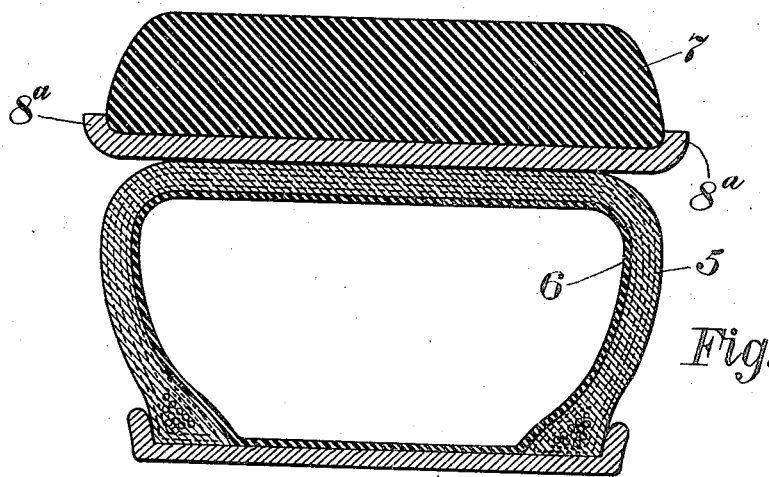
Fig. 2 is a similar view of a modification.

In Fig. 2 the construction is the same except that the edges of the interposed band are outwardly bent or curved as shown at 8ª. In this form the band forms a laterally inclosed seat for the tread. In this form also the lateral projection of the band protects the side walls of the casing. In operation the action is the same. To compensate for the greater stiffness of a band where the edges are flanged as shown in Fig. 2 that member can be made of thinner material if desired.

The forms of the parts can be changed without departing from the gist of the invention as claimed.

What I claim is:

A pneumatic tire comprising, in combination, a casing, said casing being of normally oblate form in cross section and unrestricted at its sides, a band on the tread side of said casing said band being circumferentially inexpansible but radially flexible and substantially straight and rigid in cross section and adapted to prevent radial expansion of the casing from its normal oblate form by inflation, a soft cushion tread portion superimposed on said band, said band protruding at its edges beyond the planes of the sides of said casing and protecting said sides from abrasion, substantially as described.

NATHANIEL G. WARTH.